United States Patent [19]
Inoue et al.

[11] Patent Number: 5,195,780
[45] Date of Patent: Mar. 23, 1993

[54] REAR BODY STRUCTURE OF AUTOMOTIVE VEHICLE

[75] Inventors: Michitaka Inoue; Kazuo Ikeda, both of Hiroshima; Wataru Tsutagawa, Higashihiroshima; Yoshia Oda, Kure; Shoji Nobumoto, Higashihiroshima, all of Japan

[73] Assignee: Mazda Motor Corporation, Hiroshima, Japan

[21] Appl. No.: 630,974

[22] Filed: Dec. 24, 1990

[30] Foreign Application Priority Data

Dec. 25, 1989 [JP] Japan .................. 1-149948
Nov. 13, 1990 [JP] Japan .................. 2-119076

[51] Int. Cl.⁵ .............................................. B60P 3/22
[52] U.S. Cl. ................................. 280/834; 280/830; 296/39.3; 296/204
[58] Field of Search .................. 280/830, 832, 834; 296/39.3, 204

[56] References Cited

U.S. PATENT DOCUMENTS

| | | | |
|---|---|---|---|
| 4,283,067 | 8/1981 | Weber et al. | 280/834 |
| 4,416,461 | 11/1983 | Hayashi et al. | 280/834 |
| 4,676,517 | 6/1987 | Tamura | 280/834 |
| 4,723,810 | 2/1988 | Kanemaru et al. | 296/204 |

FOREIGN PATENT DOCUMENTS

| | | | |
|---|---|---|---|
| 1964124 | 12/1969 | Fed. Rep. of Germany | 280/834 |
| 57-205227 | 12/1982 | Japan | 280/834 |
| 59-7144 | 3/1984 | Japan . | |
| 59-190023 | 10/1984 | Japan | 280/834 |
| 61-61227 | 4/1986 | Japan . | |
| 61-291217 | 12/1986 | Japan . | |

*Primary Examiner*—Eric D. Culbreth
*Attorney, Agent, or Firm*—Keck, Mahin & Cate

[57] ABSTRACT

A rear body structure of a vehicle is provided with a space, defined under a floor panel between a passenger room and a trunk room, in which a fuel tank is received. The structure includes support beams for supporting the fuel tank from an underside, in a fuel tank space. The space is formed by bending up and down a floor panel in a lengthwise direction of the car body, such as the rear floor panel of the passenger room and the trunk floor panel of the trunk room. The support beams include a pair of support beams, disposed in parallel and extending in a lengthwise direction of the car body, and a pair of connecting beams, extending in a transverse direction of the car body between and connected to the supporting beams, which are assembled as parallel crosses.

25 Claims, 6 Drawing Sheets

REAR BODY STRUCTURE OF AUTOMOTIVE VEHICLE

FIELD OF THE INVENTION

This invention pertains to part of the body structure of a vehicle, and, more particularly, to the rear body structure of a car body in which a fuel tank is installed.

BACKGROUND OF THE INVENTION

Conventionally, a fuel tank is installed under a floor panel of a car body, forming a part of a rear trunk space or room. However, one of the recent trends in vehicles, and, in particular, in passenger cars, is to lower the position of the floor of the car body. It is, therefore, now often difficult to provide a space for a fuel tank under the floor panel.

One attempt to eliminate this problem is to locate and install a fuel tank above the floor panel of the car body, in a manner designated "saddling installation," between the passenger room and rear trunk room. Such a body structure is known from, for instance, Japanese Unexamined Utility Model Publication No. 61-61227.

In such a saddling installation structure for a fuel tank, an extra or additional member is used to provide a space for the fuel tank. In effect, the fuel tank in the space occupies part of the passenger room. Hence, upon, for instance, a rear-end collision, the fuel tank is pushed into the passenger room as a result of a deformation of the extra or additional member providing the space for the fuel tank. To protect the passengers in the vehicle against injury on the occurrence of a collision, the body structure must be improved.

Body structures of this kind must permit the fuel tank to be removably installed in the fuel tank space from a side of the rear trunk room. Therefore, a worker or mechanic typically must physically climb into the interior of the rear trunk room. Such a fuel tank installation is troublesome and lowers working efficiency in comparison with, for instance, the conventional fuel tank installation.

To improve the efficiency in installing a fuel tank on the car body, it is advantageous to install a fuel tank into a space, open to the underside of the car body, which is formed or provided by a car body floor extending up from the underside of the car body. In this case, the fuel tank is bolted to and supported by a pair of front or rear brackets secured to the car body floor, or otherwise is suspended and supported by a belt.

A space for the fuel tank provided by raising up part of the car body floor, however, lowers the structural rigidity of the car body floor, in particular part of the car body floor where the fuel tank space is provided, in a lengthwise direction of the car body. This local lowering in rigidity causes a deformation of the car body floor upon a rear-end collision, resulting in an easy collapse of the fuel tank.

This kind of deformation may be suppressed to some extent by bolting the fuel tank to the brackets. Although, in this structure, the rigidity of car body floor can be increased by the fuel tank, a larger working space should be left between the fuel tank and the structure surrounding the fuel tank to allow easy bolting of the fuel tank to the brackets. This results in an inefficient use of space of the car body. On the other hand, because a belt is easily deflected due to a deformation of the car body floor during the occurrence of a rear-end collision, suspending and supporting the fuel tank by a belt or belts does not contribute to reinforcing the car body at all, in addition to requiring an inefficient use of space of the car body. For these reasons, neither of these car body structures is desirable for the installation of a fuel tank.

SUMMARY OF THE INVENTION

It is, therefore, a primary object of the present invention to provide a car body structure of a vehicle which is improved in structural rigidity and strength against rear-end collisions.

It is another object of the present invention to provide a car body structure of a vehicle, which makes it easy to install a fuel tank, and which uses more efficiently the fuel tank volume or space of a vehicle.

A rear body structure of a vehicle according to the present invention includes beams for supporting a fuel tank, from an underside, in a space defined under a floor panel between a passenger room and a trunk room. The space is formed by bending up and down a floor panel, such as a rear floor panel of the passenger room and a trunk floor panel of the trunk room, in a lengthwise direction of the car body. The beams comprise a pair of support beams, disposed in parallel and extending in a lengthwise direction of the car body, and a pair of connecting beams, extending in a transverse direction of the car body between and connected to the supporting beams, which are assembled as parallel crosses.

The rear body structure thus constructed brings about the following results:

(1) A fuel tank, which is installed on the underside of the car body, is not crushed and projected into the passenger room due to deformation of the car body, and in particular the floor panel, on a collision, such as a rear-end collision;

(2) Although the floor panel, which is bent up and down to form the space for the fuel tank, has its own lower rigidity in the lengthwise direction, the support means attached to the floor panel considerably increases the structural rigidity of the floor panel in the lengthwise direction and, accordingly, the structural rigidity of the overall rear body of the vehicle;

(3) The rear body structure allows the fuel tank to be installed through the bottom opening of the space formed in the underside of the rear body structure and to be supported by and held on the support means secured to the rear body structure surrounding the bottom opening of the space, so that the fuel tank is rather easily installed in the space as compared with being installed through the inside of the trunk room, as is conventional; and (4) The support means supports and holds thereon the fuel tank and avoids bolting or fastening the fuel tank in a small gap left between the fuel tank and the floor panel. Accordingly, a fuel a tank as large as the space can be installed, or the space can be made smaller.

BRIEF DESCRIPTION OF THE DRAWINGS

The above and other objects and features of the present invention will be apparent to those skilled in the art from the following description of preferred embodiments thereof when considered in conjunction with the appended drawings, wherein similar reference numerals have been used to designate the same or similar elements throughout the drawings, and in which:

FIGS. 9(a) through 9(d) are cross-sectional views of FIG. 8 along lines A—A, B—B, C—C and D—D, respectively.

DETAILED DESCRIPTION OF THE PREFERRED EMBODIMENTS

Figure 1:
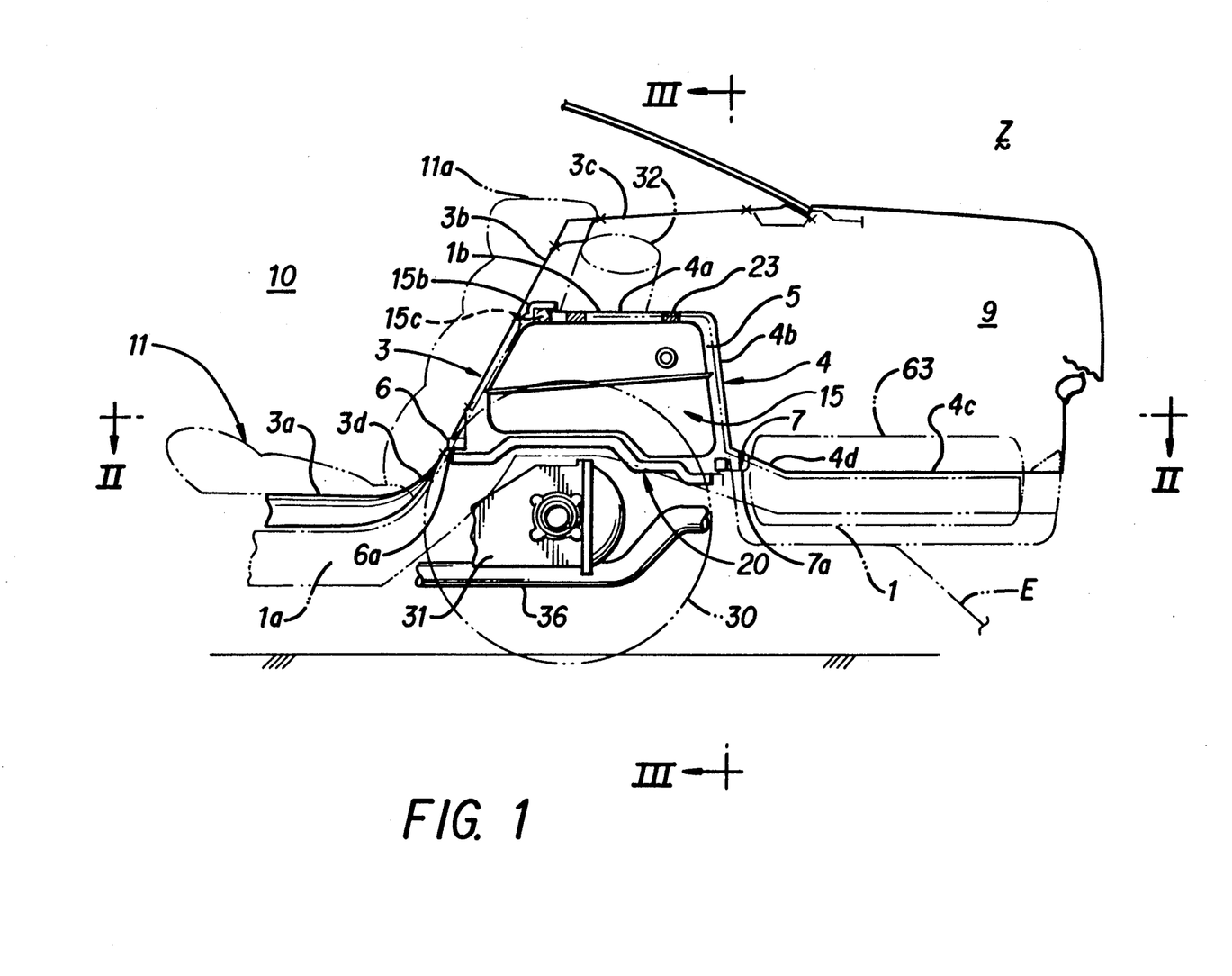
FIG. 1 is a schematic cross-sectional view of a rear body section of a car body in accordance with a preferred embodiment of the present invention.
Figure 2:
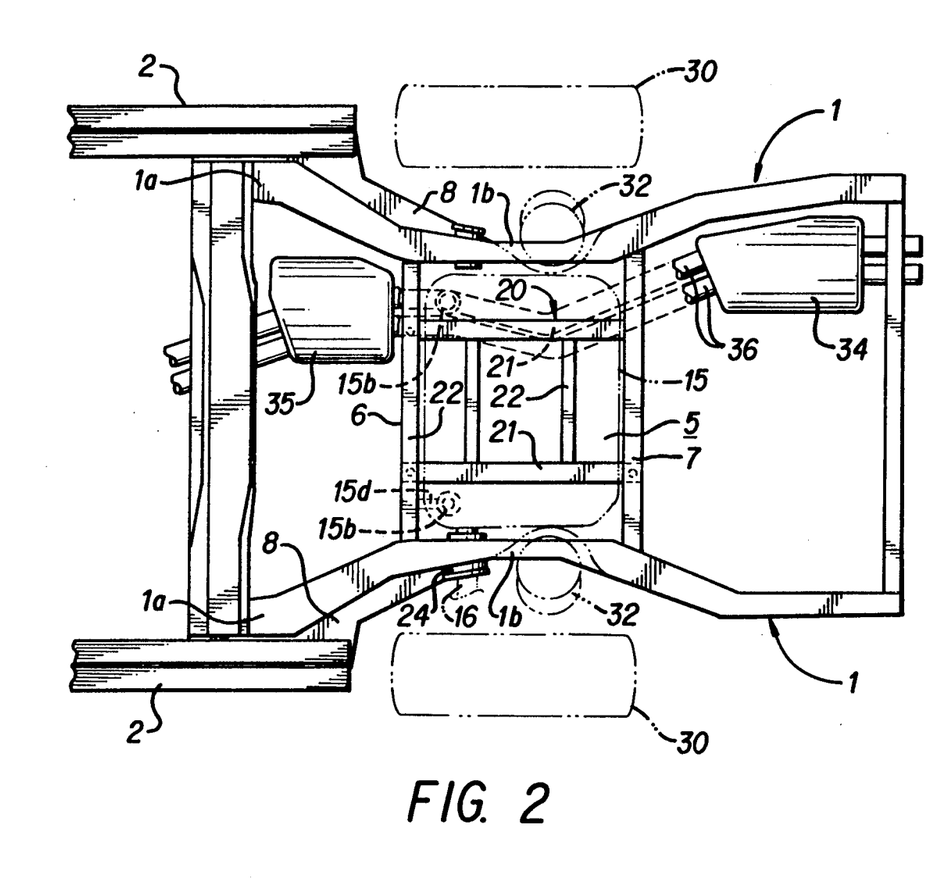
FIG. 2 is a top view of FIG. 1 along line II—II.
Figure 3:
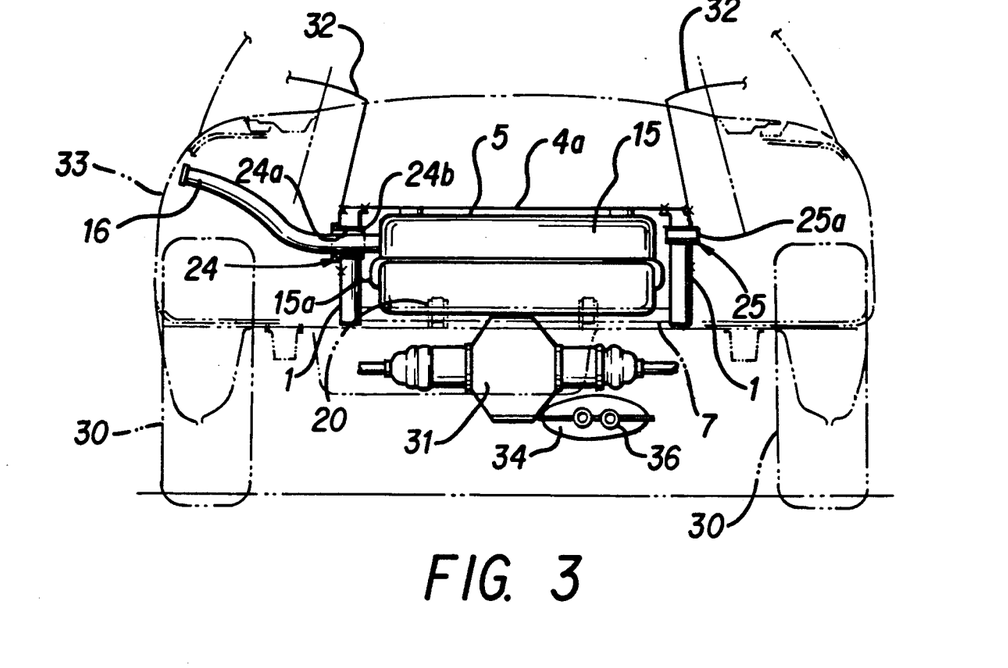
FIG. 3 is a cross-sectional view of FIG. 1 along line III—III.

Referring to the drawings in detail, and, in particular, to FIGS. 1-3, details of a rear body section in which a fuel tank is installed, generally designated by a reference character Z, are illustrated. The rear body section Z includes a pair of, i.e., left and right, rear side frames 1 located on opposite sides thereof. Each rear side frame 1 is welded, or otherwise secured, at its front end 1a to the rear end of a pair of, i.e., left and right, side sills 2.

A wheel housing 8 for enclosing a rear wheel 30 is secured to the outer side of a front half section, between the front end 1a and mid portion 1b, of each rear side frame 1. The rear wheels 30 are operationally connected to an engine mounted in a front engine room (both not shown), via a rear differential gear 31 located under the rear side frames 1 of the car body between the mid portions 1b of the rear side frames 1. Separate dual exhaust pipes 36, both leading to and from a main and a sub-silencer 34 and 35, respectively, extend in the lengthwise direction and are disposed close to the right rear side frame 1. Designated by a reference numeral 32 is a suspension tower.

As is clearly shown in FIG. 1, a rear floor panel 3 for a passenger compartment or room 10 is welded, or otherwise secured, to upper surfaces of both the rear side frames 1. This rear floor panel 3 comprises a floor section 3a, as a floor of the passenger room 10. A rear wall section 3b is inclined rearward and up at a proper angle with respect to the floor section 3a and extends to near the top end 11a of a rear seat 11 located in the passenger room 10. Rear wall section 3b forms a partition between the passenger room 10 and a rear trunk compartment or room 9. A trim section 3c is bent rearward from the rear wall section 3b and extends rearward from the top of the rear wall section 3b. The sections 3a, 3b and 3c are all formed integrally. In order to reinforce a transitional portion 3d of the rear floor panel 3 between the floor section 3a and rear wall section 3b, a front cross beam 6, transversely extending between the rear side frames 1, is secured to the back of the rear wall section 3b of the rear floor panel 3. This front cross beam 6 has its under surface 6a serving as a reference, i.e., abutment surface, for bolting thereto support means 20, which will be described later.

Trunk floor panel 4 is installed behind the rear wall section 3b of the rear floor panel 3 and comprises an upper front floor section 4a, extending horizontally rearward from the rear wall section 3b and secured, approximately midway along the height of the rear wall section 3b, to the back surface of the rear wall section 3a of the rear floor panel 3. A wall section 4b is bent down at approximately a right angle, or slightly more than a right angle, from the upper front floor section 4a. A lower rear floor section 4c is bent so as to extend substantially horizontally rearward from a transitional portion 4d connected to the lower end of the wall section 4b. All of the sections 4a, 4b, 4c and 4d are made integrally. In order to reinforce the transitional portion 4d between the wall section 4b and lower rear floor section 4c, a rear cross beam 7, transversely extending between the rear side frames 1, is secured to the under surface of the lower rear floor section 4c of the trunk floor panel 4. This rear cross beam 6 also has an under surface 7a serving as a reference or abutment surface to which the support means 20 is bolted.

The rear floor panel 3 and trunk floor panel 4, thus shaped and connected to each other, form a desired spatial dimension for fuel tank chamber 5 with a bottom opening 5a (see FIG. 4), defined by the rear wall section 3b of the rear floor panel 3, the upper front floor and wall sections 4a and 4b of the trunk floor panel 4 and the left and right side frames 1, behind the rear wall section 3b of the rear floor panel 3.

Figure 4:
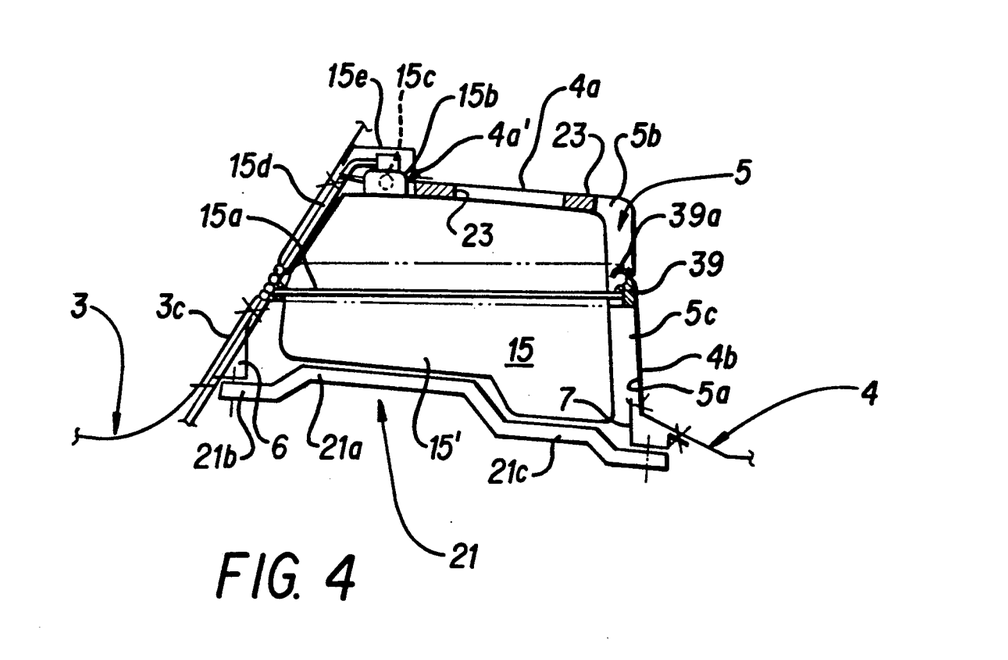
FIG. 4 is an enlarged view showing a part of the fuel tank chamber.

Referring to FIG. 4, part of the rear body section Z surrounding a gas or fuel tank 15 is shown, The fuel tank comprises, for instance, a generally rectangular box-shaped main housing 15' with a peripheral flange 15a which is made of steel or plastic. The fuel tank 15 is formed with a pair of, or left and right, fuel outlet housings 15b in which floats or float valves 15c are hinged. Each fuel outlet housing 15b is connected with a vapor storage canister (not shown) by a fuel vapor supply conduit 15d. Each outlet housing 15b projects in the rear trunk room 9 through an opening 4a' formed in the upper front floor section 4a of the trunk floor panel 4 and is covered with a cap 15e. This float valve 15c prevents fuel liquid in the fuel tank 15 from flowing out into the fuel vapor supply conduit 15d when the surface level of fuel liquid rises, due to vibrations of the car body. The fuel tank 15 is installed in the space or fuel tank chamber 5 formed in the rear body section Z of the car body through the bottom opening 5a in the underside of the car body. The fuel tank 15 in the fuel chamber 5 is supported by the support means 20 from its underside.

Referring back to FIG. 2, the support means 20 comprises a pair of, or left and right, lengthwise extending support beams 21 and a pair of, or front and rear, connecting beams 22 transversely extending between and connected to the support beams 21. Each support beam 21 is desirably made of a U-channel frame, opening downward, and comprises a middle support section 21a and front and rear sections 21b and 21c. Both ends of each support beam 21 are bolted to the under surfaces 6a and 7a of the front and rear cross beams 6 and 7, respectively, thereby firmly supporting the fuel tank 15 from the underside so that it may be installed into and retained in the rear body structure Z of the car body. Once the support means 20 has been bolted to the front and rear cross beams 6 and 7, the fuel tank 15 is stably and firmly placed on the upper surfaces of the support frames 21, particularly the support section 21a, of the support means 20. It is preferred to put cushioning members 23 between the top of the main housing 15' of the fuel tank 15 and the under surface of the upper front floor section 4a of the trunk floor panel 4 so as to press up the fuel tank 15 against the upper front floor section 4a of the trunk floor panel 4 and retain it firmly between the support frames 21 of the support means 20 and the upper front floor section 4a of the trunk floor panel 4.

As is seen in FIG. 3, a fuel filler, such as a conduit 16, which extends from the fuel tank 15 to one rear side fender 33, is supported near the fuel tank 15 by a hollow cylindrical collar 24. Collar 24 has a bore 24a with a diameter slightly larger than that of the fuel filler conduit 16 so as to provide or form a small air gap 24b between the collar 24 and the fuel filler conduit 16. The collar 24 is inserted in and secured to the left rear side frame 1. This air gap 24b is utilized as an aerating opening. The right rear side frame 1 is provided with a hollow cylindrical collar 25 having a bore 25a which serves as an aerating opening.

These bores 24a and 25a form heat dissipation openings of the collars 24 and 25 and allow air, heated by an exhaust pipe 36 and trapped in upper part of the fuel tank chamber 5 unoccupied by the fuel tank 15, to escape therethrough to outside of the fuel tank chamber 5, so as to prevent a rise in internal pressure in the fuel tank 15.

Such an undesirable effect of heat generated by exhaust gas may also be prevented by sealing means such as that shown in FIG. 4. That is, the sealing means, such as a rubber gasket 39, is fitted to periphery of the flange 15a of the main housing 15' of the tank 15 so as to be kept in contact with both inner surfaces of the wall sections 3b and 4b of the rear floor panel 3 and the trunk floor panel 4 defining the fuel tank chamber 5 when the fuel tank 15 is installed in the fuel tank chamber 5. The rubber gasket 39, when the fuel tank 15 is installed, divides the inside space of the fuel tank chamber 5 into upper and lower spaces 5b and 5c, isolated from each other, so as to prevent air heated by exhaust gas from entering the upper space 5b.

The rubber gasket 39 is preferably formed to have a top surface 39a thereof bent inwardly up so as to serve as a guide member for the fuel tank 15 relative to the inner surfaces of the wall section 3b and 4b of the rear floor panel 3 and the trunk floor panel 4 defining the space 5 when the fuel tank 15 is installed in the fuel tank chamber 5.

Because of the particular installation of the fuel tank 15 in the fuel tank chamber 5, defined by the rear floor panel 3 bent upward and the trunk floor panel 4 bent downward, the fuel tank 15 is completely located outside both the passenger room 10 and the trunk room 9. Thus, the fuel tank 15 is prevented from projecting into the passenger room 10, even when the rear floor, and hence the fuel tank chamber 5, deforms on a collision. Such is particularly helpful during a rear-end collision to protect a passenger or passengers in the passenger room 10 of the vehicle against injury from the fuel tank 15.

The rear body structure Z, which allows the fuel tank 15 to be installed in the fuel tank chamber 5 from the underside of the car body, makes the work of installing the fuel tank 15 easier as compared to typical installation of fuel tank 15 through the trunk room 9.

Furthermore, the highly-rigid support means 20, including the support beams 21 and connecting beams 22 constructed or assembled in parallel crosses, ensures the rigidity of the structure surrounding the fuel tank chamber 5. This prevents the rear floor, and hence the fuel tank chamber 5, from deforming on a collision, so as also to protect a passenger or passengers in the passenger room 10 of the vehicle against injury from the fuel tank 15.

In addition, the support means 20, attached and bolted to the front and rear cross beams 6 and 7 from the underside to support and retain firmly the fuel tank 15 in the fuel tank chamber 5, eliminates the necessity of leaving a sufficient working space between the fuel tank 15 and the rear wall section 3b of the rear floor panel 3 and the upper front floor and wall sections 4a and 4b of the trunk floor panel 4, defining the fuel tank chamber 5, for bolting, or otherwise securing, the fuel tank 15 to the rear body structure Z.

Figure 5:
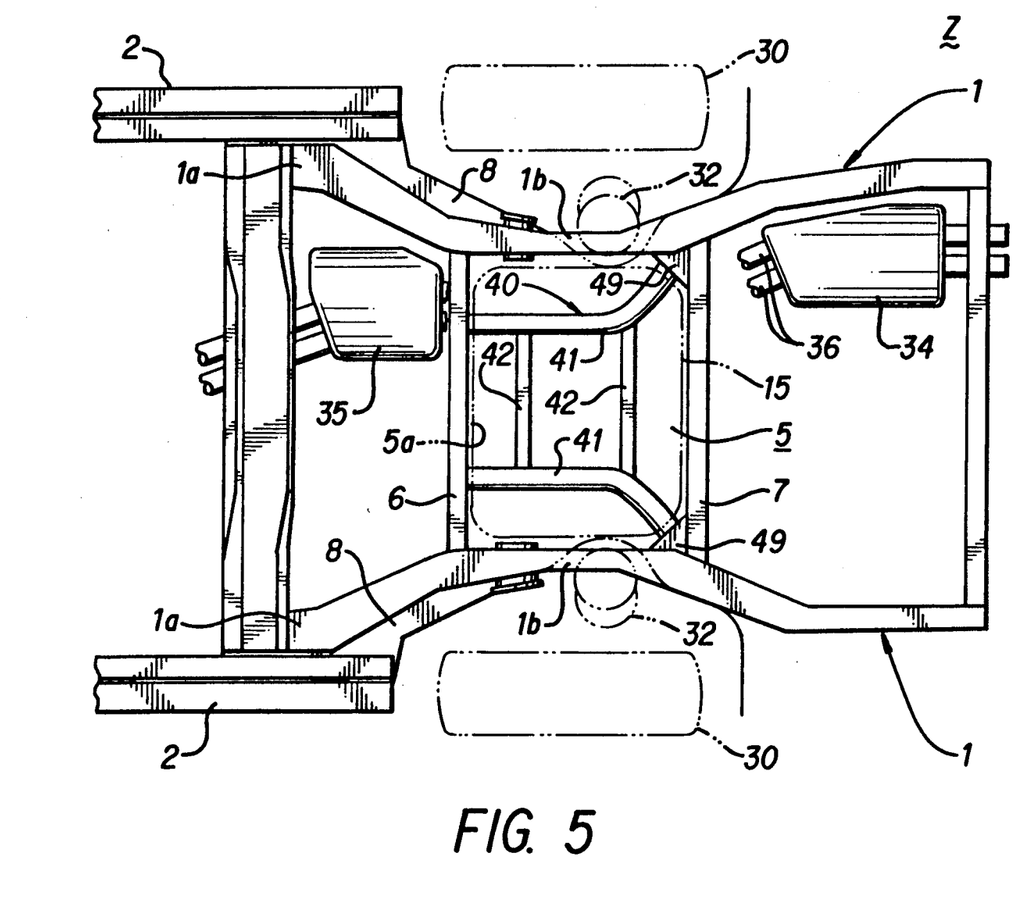
FIG. 5 is a schematic plan view of the framework of a rear body section of a car body in accordance with another preferred embodiment of the present invention.

Referring to FIGS. 5-10, showing a rear body structure Z in accordance with another preferred embodiment of the present invention, elements which are the same in structure and function as the elements of the rear body structure shown in FIGS. 1-3 are designated by same reference numerals or characters. As is shown in FIG. 5, supporting means 40, for supporting the fuel tank 15 from its underside, comprises a pair of left and right, lengthwise extending support beams 41 and a pair of front and rear, transversely extending connecting beams 42, connected in generally parallel crosses.

Figures 6, 7:
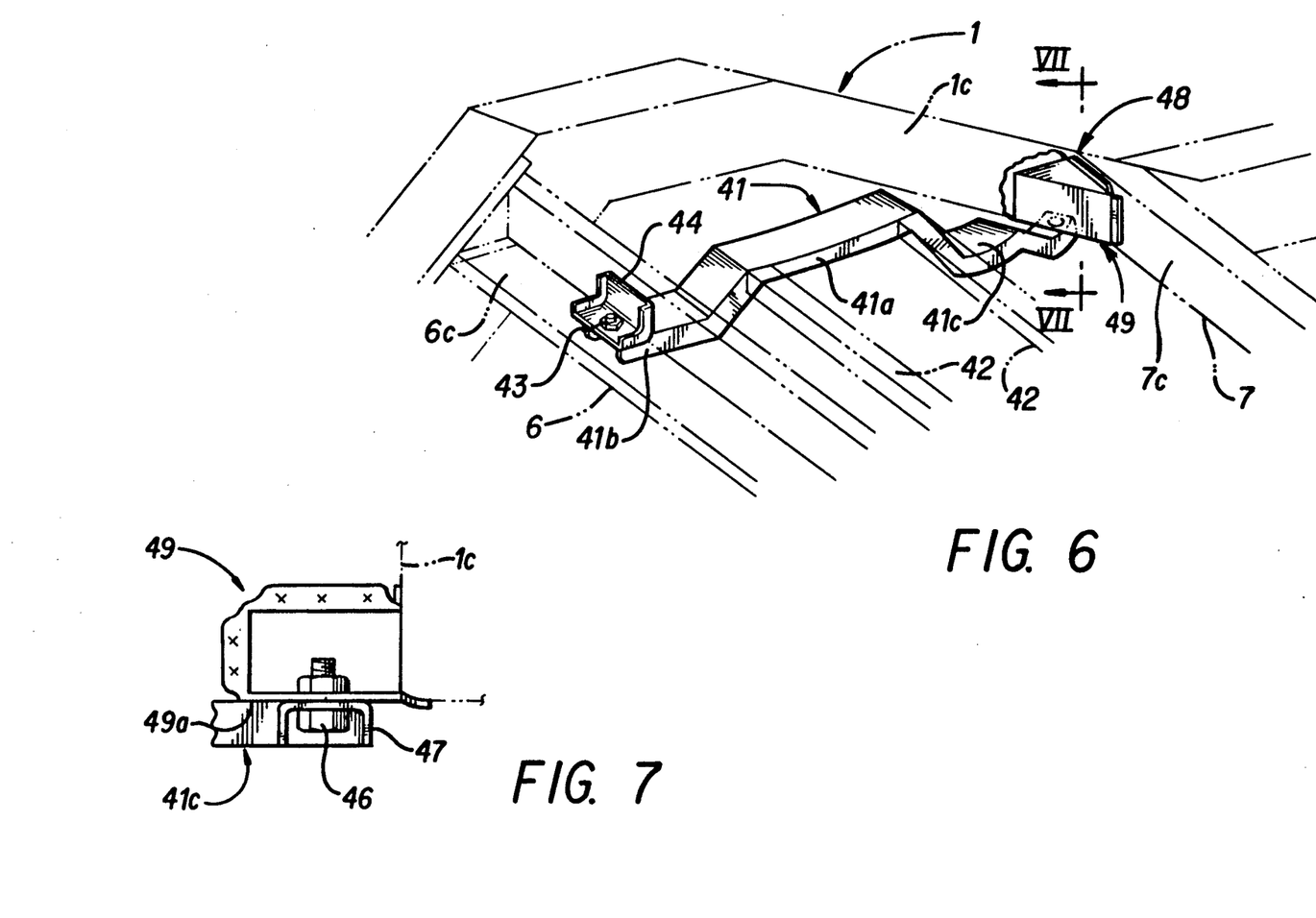
FIG. 6 is an enlarged perspective view showing part of support means of the rear body section of FIG. 5.
FIG. 7 is a cross-sectional view of FIG. 6 along line VII—VII.

As is shown in FIGS. 6 and 7, each supporting beam 41, made of an integral U-channel frame opening downward, comprises a middle support section 41a, a front section 41b extending in a straight line with respect to the support section 41a, and a rear section 41c bent outward toward a side corner 48 formed between inner surfaces 1c and 7c of the rear side frame 1 and rear cross beam 7, respectively. A triangular corner gusset 49 is welded to both the inner surfaces 1c and 7c of the rear side frame 1 and rear cross beam 7 at the side corner 48. It is to be understood that the rear body structure Z is intended to have the highest structural rigidity at the side corner 48 at each intersection of the rear side frame 1 and rear cross beam 7. The support beam 41 is secured, at its front end, by a bolt 43 to the under surface 6c of the front cross beam 6 through an L-shaped angle bracket 44 and is secured, at its rear end, by a bolt 46 through a washer cap 47 to an under surface 49a of the triangular corner gusset 49.

The transversely extending connecting beams 42 are welded, or otherwise secured, to the support sections 41a of the support beams 41.

Once the supporting means 40 has been bolted to front and rear cross beams 6 and 7, the fuel tank 15 is stably and firmly placed on the upper surfaces of the support sections 41a of the left and right support frames 41 of the supporting means 40.

Figure 8:
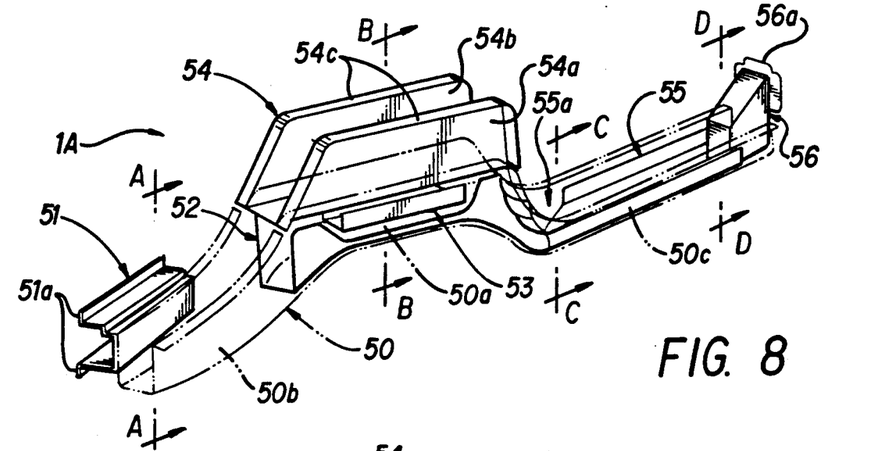
FIG. 8 is a perspective view of a rear side frame assembly as a variant of a rear side frame assembly of the rear body section of FIG. 5.
Figure 9A:
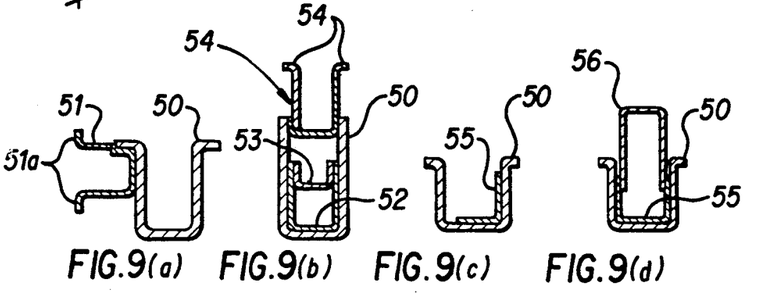

The rear body structure Z is thus improved so as to absorb impact, or external load, acting on the rear side frames and rear trunk floor panels during, for instance, the occurrence of a rear-end collision. As is shown in FIG. 8, a rear side frame assembly 1A comprises a main rear side frame 50 and six subframes 51-56 secured, as reinforcements, to the main rear side frame 50 at proper locations. All these frames, excepting fifth sub-frame 55, are made of a U-channel frame. The main rear side frame 50, opening upwardly, has three sections: a front section 50b, a middle section 50a and rear section 50c, and extends in a lengthwise direction of the car body between the side sill 2 and a rear bumper (not shown).

As is shown in FIGS. 9(a) to 9(d), first sub-frame 51, opening laterally and to the outside of the vehicle, is welded, or otherwise secured, to an outer surface of the front section 50b of the main rear side frame 50 and to an inner surface of the wheel housing 8 through its flanges 51a. Second sub-frame 52, opening upwardly, is inserted in the section 50a of the main rear side frame 50 and is welded, or otherwise secured, to an inner surface of the full length of section 50a. Third subframe 53, opening upwardly, is welded, or otherwise secured, to upper inner sides of the full length of second sub-frame 52 so as to form a closed cross-section therebetween. Fourth sub-frame 54, opening upwardly and formed with side flanges 54a and 54b (see FIG. 8) extending over its full length, is welded, or otherwise secured, to upper inner sides of the section 50a of the main rear side frame 50 so as to form a closed cross-section between the rear side frame 50 and third and fourth sub-frames 53 and 54. The fourth sub-frame 54 has a height sufficient to reach the upper front floor section 4a of the trunk floor panel 4 and is welded, or otherwise secured, to both the rear wall section 3b of the rear floor panel 3 and the upper front floor section 4a of the trunk floor panel 4 through the side flanges 54a. Therefore, the fourth sub-frame 54 serves as a side protection wall on and for each side of the fuel tank 15.

The section 50a of the main rear side frame 50, when constructed as a double closed cross-section structure as shown in FIG. 9(b), has a considerably increased structural rigidity.

Fifth sub-frame 55, in the form of a L-shaped angle frame, is inserted in the rear section 50c of the main rear side frame 50 and is welded, or otherwise secured, to the inner wall of the rear section 50c, as is shown in FIG. 9(c). As is seen in FIG. 8, the fifth sub-frame 55 overlaps at its front end and is cut off near the front end as is indicated generally by a reference number 55a. Because the fifth sub-frame 55 is partly cut off, the rear side frame assembly 1A is locally weakened in structural rigidity at the junction between the second and fifth sub-frames 52 and 55. Sixth sub-frame 56 is provided as a bumper bracket for interconnecting the main rear side frame 50 and a rear bumper (well known in the art and not shown). The sixth sub-frame 56, opening downwardly and formed with rear flanges 56a, is inserted in the rear section 50c of the main rear side frame 50 to overlap the fifth sub-frame 55 and is welded, or otherwise secured, to upper inner surfaces of the fifth sub-frame 55, as is shown in FIG. 9(d).

The rear body section Z including the rear side frame assembly 1A has a higher structural rigidity between its front and mid portions and a lower structural rigidity between its mid and rear portions and, therefore, controls an impact acting on the fuel tank 15 and the passenger room 10 during a rear-end collision. Since the rear side frame assembly 1A is weak in structural rigidity particularly at the front end of the fifth sub-frame 55, it is easy to crush the rear body section Z between the section 50a and rear section 50c upon a rear-end collision, so as to effectively absorb impact load acting thereon.

Figure 10:
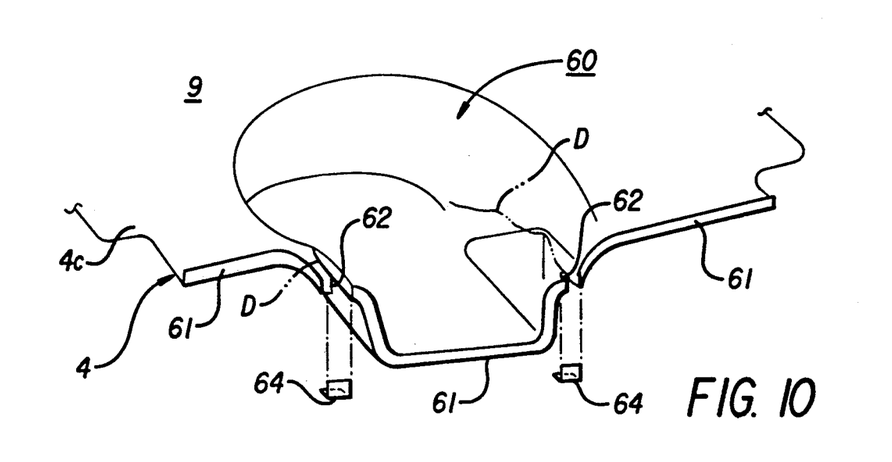
FIG. 10 is a schematic view showing part of a trunk room.

The rear body structure Z is also improved so as to absorb impact upon a rear-end collision load by varying the structure surrounding the trunk room 9. As is shown in FIG. 10, the trunk room 9 is typically provided with a spare tire space 60 formed by bending the lower rear floor section 4c of the trunk floor panel 4 in a transverse direction of the car body. The lower floor section 4c of the trunk floor panel 4 is formed with flanges 61 along its rear edge over its full length. These flanges 61 are secured to a rear wall (not shown) of the trunk room 9. The lower rear floor section 4c of the trunk floor panel 4 is also formed with notches 62 in the rear edge on both sides of the space, such as the spare tire space or chamber 60. Because external load, acting in the trunk floor panel 4 during a rear-end collision, concentrates in the notches 62, the lower rear floor section 4c of the trunk floor panel 4 cracks along crack lines D, which will develop in the lengthwise direction from the notches 62, as is shown in FIG. 10. As the external load acting on the rear body structure Z from its rear end becomes higher, the cracks along lines D become larger, and a spare tire 63 (see FIG. 1) bends down a part E of the lower rear floor section 4c between the crack lines D, as is shown in FIG. 1, and slides down on the part E. As a result, the trunk floor panel 4 can be crushed over a wide area upon a collision, so as to effectively absorb the external load acting thereon during the occurrence of a rear-end collision. Furthermore, because the spare tire 63 slides down upon a rear-end collision, the fuel tank 15 is protected against deformation by the spare tire 63. For a neat edge line of the lower rear floor section 4c of the trunk floor panel 4, a seal member, such as a plastic closer 64, may be attached to each notch 62.

It is to be understood that although the invention has been described in detail with respect to a preferred embodiment, nevertheless, various other embodiments and variants are possible which are within the spirit and scope of the invention, and such other embodiments and variants are intended to be covered by the following claims.

What is claimed is:

1. A rear body structure of a vehicle including at least a passenger room and a trunk room, comprising:
    a pair of rear side frames separately located in a transverse direction of the vehicle and extending in a lengthwise direction, from front to back, of the vehicle;
    cooperating means for cooperating with said pair of rear side frames to form a fuel tank chamber with a bottom opening open in an underside of the vehicle;
    a fuel tank installed in said fuel tank chamber;
    rigid means, extending across over said bottom opening in said lengthwise direction and secured to said cooperating means, for supporting said fuel tank from an underside of said fuel tank; and
    a pair of cross beams extending in a transverse direction of the vehicle between said pair of rear side frames and located separately on both sides of said bottom opening in said lengthwise direction, to which said rigid means is secured, wherein said rigid means comprises support beams, each extending in said lengthwise direction and connected to said pair of cross beam, and connecting beams, each extending in said transverse direction and connected to said support beams.

2. A rear body structure as recited in claim 1, wherein said fuel tank comprises a generally rectangular, box-shaped main housing and an outlet housing, located at a front end of a top of said main housing, which projects into said fuel tank chamber.

3. A rear body structure as recited in claim 2, and further comprising a float valve disposed in said outlet housing.

4. A rear body structure as recited in claim 2, and further comprising cushioning means for cushioning said fuel tank disposed in said fuel tank chamber between a top of said main housing and said cooperating means.

5. A rear body structure as recited in claim 2, and further comprising heat dissipation means for discharging heated air in said fuel tank chamber.

6. A rear body structure as recited in claim 5, wherein said heat dissipation means comprises a bore formed in an upper part of at least one of said rear side frames for communicating inside and outside of said fuel tank chamber.

7. A rear body structure as recited in claim 2, and further comprising heat isolation means for isolating said fuel tank chamber from the atmosphere.

8. A rear body structure as recited in claim 7, wherein said heat isolation means comprises a sealing gasket disposed in said fuel tank chamber so as to surround four sides of said fuel tank and to be in contact with said cooperating means.

9. A rear body structure of a vehicle, comprising:
a pair of rear side frames located separately in a transverse direction of the vehicle and extending in a lengthwise direction, from front to back, of the vehicle;
a pair of cross beams extending in said transverse direction between said pair of rear side frames and located separately in said lengthwise direction, each cross beam being connected to said pair of rear side frames so as to form side corners therebetween;
cooperating means for cooperating with said pair of rear side frames and said pair of cross beams to form a fuel tank chamber with a bottom opening open in an underside of the vehicle;
a fuel tank installed in said fuel tank chamber; and
rigid means, secured between one of said pair of cross beams and said side corners formed by said pair of rear side frames and the other of said pair of cross beams, for supporting said fuel tank from an underside of said fuel tank, wherein said rigid means comprises support beams between and connected to one of said pair of cross beams and said side corners formed by said pair of rear side frames and the other of said pair of cross beams, and a pair of connecting beams, each extending in said transverse direction and connected to said pair of support beams.

10. A rear body structure as recited in claim 9, and further comprising a gusset secured to at least one of said rear side frames and at least one of said cross beams at at least one of said side corners, to which at least one of said support beams is connected.

11. A rear body structure as recited in claim 10, wherein each support beam comprises a middle section for supporting said fuel tank thereon, a front section extending from said section to said one of said pair of cross beams, and a rear section extending from said section to said side corner.

12. A rear body structure as recited in claim 11, wherein said connecting beams are secured to said middle section.

13. A rear body structure as recited in claim 11, wherein each of said rear side frames comprises a middle section, a front section extending from said middle section to a side sill and a rear section extending rearwardly from said middle section.

14. A rear body structure as recited in claim 13, wherein each of said rear side frames comprises a substantially U-channeled frame opening upward.

15. A rear body structure as recited in claim 14, wherein each of said rear side frames further comprises a substantially U-shaped channel frame inserted in said middle section so as to form a closed cross-section in said middle section.

16. A rear body structure as recited in claim 14, wherein each of said rear side frames further comprises a substantially L-shaped angle frame inserted in said rear section, said substantially L-shaped angle frame being connected to said substantially U-shaped channel frame.

17. A rear body structure as recited in claim 16, wherein said substantially L-shaped angle frame is cut off near said substantially U-shaped channel frame so as to locally weaken said rear side frames in structural rigidity.

18. A rear body structure as recited in claim 10, wherein said fuel tank comprises a generally rectangular box-shaped main housing, and an outlet housing, located at a front end of a top of said main housing, which projects outside said fuel tank chamber.

19. A rear body structure as recited in claim 18, and further comprising a float valve disposed in said outlet housing.

20. A rear body structure as recited in claim 18, and further comprising cushioning means for cushioning said fuel tank disposed in said fuel tank chamber between a top of said main housing and said cooperating means.

21. A rear body structure as recited in claim 18, and further comprising heat dissipation means for discharging heated air in said fuel tank chamber.

22. A rear body structure as recited in claim 21, wherein said heat dissipation means comprises a bore formed in an upper part of at least one of said rear side frames for communicating inside and outside of said fuel tank chamber.

23. A rear body structure as recited in claim 22, wherein said fuel filler conduit extends through said bore while leaving an air gap in said bore.

24. A rear body structure as recited in claim 18, and further comprising heat isolation means for isolating said fuel tank chamber from atmosphere.

25. A rear body structure as recited in claim 24, wherein said heat isolation means comprises a sealing gasket disposed in said fuel tank chamber so as to surround four sides of said main housing and to be in contact with said cooperating means.

* * * * *